United States Patent [19]

Cussons et al.

[11] 4,112,118

[45] Sep. 5, 1978

[54] PROCESS FOR PREPARING PHOSPHATE SALTS

[75] Inventors: Frank Michael Cussons, Cumbria; Douglas Edward Mather, Whitehaven; Thomas Alan Williams, Beckermet, all of England

[73] Assignee: Albright & Wilson Ltd., West Midlands, England

[21] Appl. No.: 709,632

[22] Filed: Jul. 29, 1976

[30] Foreign Application Priority Data

Aug. 5, 1975 [GB] United Kingdom ............... 32642/75

[51] Int. Cl.$^2$ .................... C01B 15/16; C01B 25/26
[52] U.S. Cl. .................................... 423/313; 423/309; 423/310; 71/43
[58] Field of Search .................... 423/309, 313, 321 S, 423/310, 312, 308; 71/43

[56] References Cited

U.S. PATENT DOCUMENTS

| | | | |
|---|---|---|---|
| 1,929,443 | 10/1933 | Milligan | 423/309 |
| 3,298,782 | 1/1967 | Archambault | 423/321 S |
| 3,914,382 | 10/1975 | Williams | 423/321 S |
| 3,947,499 | 3/1976 | Edwards et al. | 423/321 S |
| 4,018,869 | 4/1977 | Beltz et al. | 423/321 S |
| 4,024,225 | 5/1977 | Ching | 423/321 S X |

*Primary Examiner*—O. R. Vertiz
*Assistant Examiner*—Gregory A. Heller
*Attorney, Agent, or Firm*—Flynn & Frishauf

[57] ABSTRACT

Phosphate values can be recovered from an organic extract which is formed by contact of wet process phosphoric acid and a water immiscible solvent, in a process in which the extract is treated with an inorganic base or a dihydrogen phosphate salt to give an acid free solvent and an aqueous solution of phosphoric acid and phosphate salt with a cation to P usually in the 0.1 - 0.5 : 1 region. The aqueous solution represents a concentrated soluble phosphate source for subsequent neutralization and conversion to e.g. tripolyphosphates.

20 Claims, No Drawings

PROCESS FOR PREPARING PHOSPHATE SALTS

This invention relates to a process for preparing phosphate salts from phosphoric acid extracted from crude wet process phosphoric acid by means of a water immiscible organic solvent.

The use of the solvent to extract the acid from the crude wet process acid has been known for many years. The acid may be released from the acid laden extract by a variety of methods, e.g., addition of water or base, usually with water, in a few cases only heating optionally with addition of a little water, or distillation of the solvent. The released acid has fewer impurities than the crude acid from which it was made. Examples of the known solvents are alcohols such as butanol and isoamyl alcohol, dialkyl ethers such as di-isopropyl ether, trialkyl phosphates such as tributyl phosphate, cyclohexanone, aliphatic ketones such as methyl propyl ketone, diethyl ketone and methyl isobutyl ketone, and alkanoate esters such as butyl acetate.

Where the use of aqueous base as the release agent has been proposed, the amount of the base has been such as to convert the phosphoric acid in the extract directly into the desired phosphate salt, e.g. the mono, di or tri sodium phosphate or a mixture thereof. Thus the amount of monovalent base would be at least equimolar with the amount of phosphoric acid in the solvent. It has also been proposed in U.S. Pat. No. 3,767,769 to treat a tributyl phosphate extract of phosphoric acid with an aqueous solution of sodium phosphate such as to provide a product solution believed to contain an Na:p ratio of about 0.89: 1.

In German Published Application No. P2,320,877 we describe the contact of an extract of phosphoric acid in a dialkyl ketone of 5 or 6 carbon atoms with an aqueous solution of base in amount preferably to give an aqueous solution of dihydrogen phosphate but addition of less base is also mentioned.

The neutralization of the acid in the extract liberates a substantial amount of heat especially when the ratio of equivalents of base to moles of acid is more than 1.5 : 1, and this may cause solvent losses by evaporation or decomposition. With ratios of base to acid in the 1 : 1 to 1.5 : 1 region, a substantial amount of heat is still evolved, and in addition the product di hydrogen phosphate salt tends to crystallize out easily on cooling even to 80° C leading to blocked lines during plant shut downs.

We have now found that substantially all the acid can be released from the extract by contact with an amount of base much less than the stoichiometric amount needed to make the dihydrogen phosphate salt, and yet with use of no added water or a minimal amount of added water, to produce a concentrated aqueous phosphate solution.

The present invention provides a process for preparing a phosphate salt comprising contacting a one phase solution of phosphoric acid and water in an organic water immiscible solvent, which is preferably a dialkyl ketone, a dialkyl ether, an alkyl alkanoate or alkanol, each of 4 to 7 carbon atoms, said solution preferably containing less than 2,000 ppm total metal impurities, (based on the weight of $H_3PO_4$ in the solution), with a compound which is ammonia or a basic compound of ammonia sodium or potassium or a dihydrogen phosphate salt of ammonia, sodium or potassium, the ratio of the number of equivalents of said compound to the number of moles of phosphoric acid being not greater than 0.75 : 1, and usually in the range 0.1 : 1 to 0.75 : 1, preferably 0.1 : 1 to 0.5 : 1, to give a liquid phase mixture comprising an organic solvent phase substantially free of phosphoric acid and an aqueous phase comprising phosphoric acid and a dihydrogen phosphate salt, and separating the organic phase from said aqueous phase, the ratio of the number of equivalents of said compound to the number of moles of phosphoric acid and the temperature being chosen so that (a) the aqueous phase has a crystallization point of below 30° C, e.g. below 20° C preferably below 10° C, and (b) the temperature of each of the aqueous and organic phases is less than the boiling point of that phase under the reaction conditions.

In a further respect, the present invention provides a process for preparing a phosphate salt which comprises contacting a one phase solution of phosphoric acid and water in an organic water immiscible solvent, which is preferably a dialkyl ketone, a dialkyl ether, an alkyl alkanoate or an alkanol, each of 4 to 7 carbon atoms, said solution preferably containing less than 2,000 ppm total metal impurities (based on the weight of $H_3PO_4$ in the solution), with a dry or aqueous compound which is ammonia or a basic compound of sodium, ammonium or potassium, or a dihydrogen phosphate salt of ammonia, sodium or potassium, to give a liquid phase mixture comprising an organic solvent phase substantially free of phosphoric acid and an aqueous phase comprising phosphoric acid and a dihydrogen phosphate salt, the amount of said compound being at least that required to produce a product of formula $MH_2PO_4 \cdot H_3PO_4 \cdot H_2O$, where M is ammonium, sodium or potassium, leaving no more phosphoric acid in the organic phase than can be released to give the said aqueous phase by the total of the water present in the organic phase, any water added with said compound and any water formed in neutralization of said compound, and the amount of said compound being at most that which will give a concentration of dihydrogen phosphate in the aqueous phase such that the aqueous phase has a crystallization point of 30° C and at most that which make the aqueous and/or organic phases boil under the reaction conditions.

In a further aspect the present invention provides a process for preparing a phosphate salt which comprises contacting a one phase solution of phosphoric acid and water in an organic water immiscible solvent, which is preferably a dialkyl ketone, a dialkyl ether or an alkyl alkanoate, or an alkanol, each of 4 to 7 carbon atoms, said solution preferably containing a total of less than 2,000 ppm total metal impurities (based on the weight of $H_3PO_4$ in the solution) with a base, which is ammonia or a basic compound of ammonium sodium or potassium, the base being anhydrous or with water in an amount of up to 10 moles, preferably up to 5 moles per mole of base, (e.g. 0.5 – 5 or 0.5 – 3 moles water per mole of base) to give a liquid phase mixture comprising an organic solvent phase substantially free of phosphoric acid and an aqueous phase comprising phosphoric acid and the dihydrogen phosphate salt of the base, and then separating the organic phase from said aqueous phase, the amount of base being the value which under the reaction conditions is at least sufficient to release substantially all the acid from the organic solvent solution and at most, $x$ times that value, where $x$ is governed by the relationship $$x = \frac{b + 2c + d - 1}{b + 1.9c + d - 0.9} \text{ preferably } \frac{9}{10}\left[\frac{b + 2c + d - 1}{b + c + d}\right]$$

in which $b$ is the number of moles of water associated with each mole of base added, $d$ is the number of moles of water produced by the neutralization of one mole of phosphoric acid by an equivalent of base and $c$ is the minimum number of moles of water per mole of phosphoric acid in an aqueous phosphoric acid solution in equilibrium with substantially acid free solvent at the aqueous reaction temperature. Preferably the ratio ($x$) between the maximum amount of base to the minimum amount of base needed to release the acid is governed by the relationship $$x = \frac{b + 2c + d - 1}{b + 1.5c + d - 0.5}$$

Of the variables, $b$ and $d$ depend on the nature of the base and the amount of water (if any) added with the base and thus can easily be calculated. Variable c can be determined experimentally by adding water to the organic extract at a temperature the same as that found in the release with base, until substantially all the acid has been released from the organic extract into the water whereupon the concentration of acid in the aqueous solution is measured, and hence the molar proportion c of water to acid in that solution can be found. Alternatively the molar proportion $c$ can be calculated from any published 3 component phase diagrams giving tie line data for the system, acid : water : solvent at the requisite temperature.

In particular, we have found that the base may be added substantially dry (e.g. as ammonia or solid sodium carbonate or hydroxide) to give a solvent layer substantially free of acid and an aqueous solution phase comprising the dihydrogen phosphate salt of the base and phosphoric acid.

The present invention also provides a process for preparing a phosphate salt which comprises contacting a one phase solution of phosphoric acid and water in an organic water immiscible solvent which is preferably a dialkyl ketone, a dialkyl ether, an alkyl alkanoate or an alkanol, each of 4 to 7 carbon atoms, said solution preferably containing a total of less than 2,000 ppm total metal impurities (based on the weight of $H_3PO_4$ in the solution), with a dihydrogen phosphate salt of ammonia, sodium or potassium, the salt being anhydrous or with water in an amount of up to 10 moles, preferably up to 5, or e.g. 0.5 – 5 or 0.5 – 3 moles per mole of salt, to give a liquid phase mixture comprising an organic solvent phase substantially free of phosphoric acid and an aqueous phase comprising phosphoric acid and the dihydrogen phosphate salt, and then separating the organic phase from said aqueous phase, the amount of salt being at least the value which is just sufficient to release substantially all the acid from the organic solvent solution, and at most $y$ times that value where $y$ is governed by the relationship $$y = \frac{b + c - 1}{b + 0.9c - 0.9} \text{ preferably } \frac{9}{10}\left[\frac{b + c - 1}{b}\right]$$

in which $b$ is the number of moles of water associated with each mole of dihydrogen phosphate added, and $c$ is the minimum number of moles of water per mole of phosphoric acid in an aqueous phosphoric acid solution in equilibrium with substantially acid-free solvent at the aqueous reaction temperature. Preferably $y$ is governed by the relationship $$y = \frac{2b + 2c - 2}{2b + c - 1}$$

The present invention also provides an aqueous one phase solution of phosphoric acid and a dihydrogen phosphate salt of a cation, which is ammonium, sodium or potassium, with the molar proportion of cation to total phosphate of 0.1 : 1 to 0.5 : 1, e.g. 0.1 : 1 to 0.45 : 1 preferably 0.1 : 1 to 0.35 : 1 and especially 0.2 : 1 to 0.35 : 1 and usually at least one organic water immiscible solvent which is substantially immiscible with water but miscible with anhydrous phosphoric acid and which is preferably a dialkyl ketone, a dialkyl ether, alkyl alkanoate or alkanol, each of 4 to 7 carbon atoms, the nature of the solvent and the phosphoric acid content being such that if said solution were contacted with more of the same solvent in a 1 : 1 weight ratio, there would be an aqueous phase and organic phase and substantially no extraction of acid into the organic solvent phase. The one phase aqueous solution is usually saturated with the particular solvent. The aqueous solution usualy contains per 100 g water an amount of phosphoric acid of 0.3 – 2.8 e.g. 1.1 – 2.8, preferably 1.1 – 2.1 especially 1.1 – 1.7 g mole, and an amount of the dihydrogen phosphate salt of 0.15 – 2.5 e.g. 0.20 – 2.5 g mole, preferably 0.25 – 1.5 g mole and especially 0.3 – 0.9 g mole, the acid and salt being in a molar ratio fulfilling the 0.1 : 1 to 0.45 : 1 criteria for cation to total phosphate given above; solutions of the above concentrations may be most easily prepared when the solvent is a dialkyl ketone of 5 or 6 carbon atoms, e.g. methyl isobutyl ketone or a dialkyl ether of 6 carbon atoms. e.g. diisopropyl ether. These aqueous one phase solutions may be prepared by processes of this invention.

Though we do not wish to be bound by any theory, we believe that in the aqueous solution after the release there is free hydrated phosphoric acid and a 1:1:1 molar complex of the dihydrogen phosphate salt phosphoric acid and water.

The organic solvent is not miscible with water but miscible with anhydrous phosphoric acid. It may be a dialkyl ketone of 4 to 7 carbon atoms, preferably 4 to 6 carbon atoms, e.g., methyl ethyl ketone, methyl n-propyl ketone, diethyl ketone, methyl isobutyl ketone or pinacolone, or a dialkyl ether of 4 to 7, e.g. 4 to 6 carbon atoms, such as diethyl ether, di n-propyl ether or diisopropyl ether, or an alkyl alkanoate of 4 to 7 e.g. 4 to 6 carbon atoms, such as n-butyl acetate, ethyl amyl or propyl acetate, isopropyl acetate and methyl and ethyl propionate, or an alkanol of 4 to 7, e.g. 4 to 6 carbon atoms, such as n, iso and tert butanol, n-, iso and tert. amyl alcohol or a hexanol or heptanol, or cycloaliphatic ketone of 5 – 7 carbon atoms such as cyclohexanone or cyclopentanone, or a tri alkyl phosphate in which each alkyl group contains 1 – 6, e.g. 3 – 6 carbon atoms, such as tributyl phosphate. Preferably the solvent is a dialkyl ketone of 5 or especially 6 carbon atoms, most especially methyl isobutyl ketone, or diisopropyl ether or butyl acetate.

The base is ammonia or a basic ammonium sodium or potassium compound, e.g. the oxide, hydroxide, carbonate, bicarbonate or phosphate; sodium hydroxide is the preferred sodium compound and is usually added in aqueous solutions containing at least 40% e.g. 40 – 75% NaOH, e.g. 47% or 70%. The phosphate may be the basic trisodium phosphate or disodium hydrogen phosphate or even sodium dihydrogen phosphate, or a mixture of any of these including mixtures with an Na : P atom ratio less than 1 so long as the final aqueous solution after release of the phosphoric acid into the phosphate solution has the desired Na : P atom ratio, which is usually less than 0.5 : 1. Corresponding potassium and ammonium salts may also be used. To avoid the direct contact of ammonia, or sodium or potassium hydroxides, and the acid laden solvent, it is preferred that these bases are mixed first with a phosphate solution as a buffer and diluent. A suitable phosphate solution is the aqueous product phase of this process, so in a preferred form a portion usually 20 – 60% e.g. 40-60% of the aqueous product phase with cation : P molar ratio of e.g. 0.3 : 1 is mixed with the base solution to give a cation : P ratio of e.g. 0.5 : 1 to 1.5 : 1, preferably 0.5 : 1 to 0.8 : 1 which then contacts fresh acid laden solvent. Since the recycled phosphate solution is a recycled diluent, the amount of base needed is as though the extract were contacting the base directly.

The minimum amount of base or dihydrogen phosphate salt is that needed to convert the organic solution of phosphoric acid into a solvent layer substantially free from phosphoric acid (i.e. containing less than 3%, preferably less than 1% of the original amount of phosphoric acid present therein) and an aqueous solution of phosphoric acid and the dihydrogen phosphate salt of the base. The minimum amount can be determined by simple experiment involving titration of a sample of the acid laden organic phase with the desired base or dihydrogen phosphate whether anhydrous or in aqueous solution or slurry until the organic phase is substantially free of acid, this condition being known when the density of the organic phase reaches a minimum corresponding to the density of the wet solvent at that temperature.

The act of neutralizing some of the acid in the organic phase and releasing the rest into an aqueous phase is exothermic, and therefore to minimize the amount of heat liberated during the step of releasing the acid from the organic phase and reduce decomposition and boiling of the solvent, it is preferable to use an amount of base or dihydrogen phosphate at or not more than 1.4 times the minimum amount needed; when diisopropyl ether is the solvent the amount of base or dihydrogen phosphate is preferably not more than 1.2 times the minimum. While the minimum amount can be found easily by simple experiment in each case, general indications of the size of the minimum and the factors affecting it can be given.

The molar amount of base or dihydrogen phosphate is usually sufficient to provide a cation : P ratio within the range 0.1 : 1 to 0.45 : 1, though the particular maximum and minimum vary according to the nature of the solvent, the temperature of the aqueous phase after the reaction and that of the organic phase before it, the nature of the base or dihydrogen phosphate and the amount of water (if any) added with the base. When the acid laden extract is treated with a base, the minimum proportion of the number of equivalents of base to number of moles of phosphoric acid present in the extract is usually about that corresponding to the formula $$\frac{c-a}{b+2c+d-1}$$

where $b$, $c$, and $d$ are as defined above and $a$ is the number of moles of water per mole of phosphoric acid in the organic phase when it contacts the base. When the acid laden extract is treated with a dihydrogen phosphate the minimum is usually about that corresponding to the formula $$\frac{c-a}{b+c-1}$$

The approximate value for the minimum can be calculated using the above formulae, when each of the variables (a) – (d) is known or determinable.

The nature of the solvent and the temperature of the aqueous and organic phases matter because different solvents have different ratios of the molar proportion of water to phosphoric acid in their organic solvent solutions, (variable a above) to that ratio in their aqueous solutions with a maximum concentration of acid in equilibrium with substantially acid free solvents, (variable c above). In each case the molar proportions of water to acid in each phase also varies with temperature. Thus with methyl isobutyl ketone (MIBK) as solvent, the species in the organic phase is $H_3PO_4 \cdot 2H_2O$ at 25° C, while the species in the aqueous phase at 60° C in equilibrium with acid free solvent contains a minimum amount of water when it has the composition $H_3PO_4 \cdot 5H_2O$, giving a ratio of the molar propertions of water to acid in the two phases of 2 : 5 or 1 : 2.5. In contrast the corresponding compositions for the acid species when diisopropyl ether (IPE) is solvent are $H_3PO_4 \cdot H_2O$ and $H_3PO_4 \cdot 2H_2O$ respectively giving a ratio of 1 : 2. The molar ratios for other solvents within the group used in the process of the invention generally lie in the 1 : 2.0 to 1 : 5.0 e.g. 1 : 2.0 to 1 : 3.0 region. To show the effect on the minimum amount of base needed of the change in solvent, that with 47% sodium hydroxide as the base and MIBK as solvent is 0.29 : 1 and for IPE 0.22 : 1 for organic phase at 25° C to give an aqueous phase at 30° C.

The effect of temperature on the nature of the hydrated phosphoric acid species in the aqueous and organic phases can be seen from the fact that with MIBK as solvent and no base present, the aqueous phase, which contains the minimum amount of water and yet is still is equilibrium in the substantially acid free solvent, has the overall proportion of acid to water corresponding to $H_3PO_4 \cdot 5H_2O$ at 60° C, $H_3PO_4 19 \cdot 6H_2O$ at 25° C and $H_3PO_4 \cdot 4H_2O$ at 90° C. Thus release with the aqueous phase at a higher temperature requires a lower minimum amount of base to phosphate.

The nature of the base affects the minimum because the act of neutralization with ammonia produces no water from the ammonia molecule or any phosphate salt but half a molecule of water is produced per molecule of sodium or potassium carbonate and one molecule of water per molecule of sodium or potassium hydroxide or hydrogen carbonate. Whether the base is added anhydrous or in aqueous solution or slurry also affects the amount of water present in the neutralization. The higher the amount of water added with the base and/or produced during the neutralization the smaller the minimum amount of base needed to liberate substantially all the acid. Thus for sodium hydroxide as the base, MIBK as solvent with an acid laden solvent temperature of 25° C and an aqueous phosphoric acid/dihydrogen phosphate solution temperature of about 30° C, the minimum molar amount of base to phosphoric acid is 0.4 : 1 for anhydrous sodium hydroxide, 0.29 : 1 for the commercial 47% solution of formula $NaOH \cdot 2.5H_2O$, and 0.15 : 1 for an 18% solution of formula $NaOH \cdot 10H_2O$. But the more dilute the solution of base the less concentrated is the final aqueous solution prepared. The major use of the aqueous solution prepared by the process of the invention is for further neutralization and then spray drying or crystallization to recover phosphate salts. Hence in general the more concentrated the aqueous solution produced by the process the better and therefore the minimum amount of added water is preferred.

A general indication of the size of the minimum for a process involving contact of the organic solution at about 25° C with various bases to give an aqueous phase at about 60° C and a substantially acid free solvent phase is shown in the table below.

|  | Solvent | | | |
| --- | --- | --- | --- | --- |
|  | MIBK | IPE | Butyl Acetate | Methyl Propyl ketone |
| No. of molecules of water per molecule $H_3PO_4$ in organic phase (a). | 2 | 1 | 2½ | 4 |
| No. of molecules of water per molecule $H_3PO_4$ in aqueous phase (c). | 5 | 2 | 4 | 9.0 |
|  | Minimum proportion of base to acid | | | |
| $NH_3$ dry | 0.33 | 0.33 | 0.21 | 0.29 |
| $Na_2CO_3$ dry | 0.31 | 0.29 | | |
|  | (aq. at 50°) | (aq. at 50° C) | | |
| NaOH dry | 0.30 | 0.25 | | |
| $NH_3 \cdot 1.94 H_2O$ (0.880 ammonia) | 0.27 | 0.20 | | |
| $NaOH \cdot 0.95H_2O$ (commercial 70%) | 0.27 | 0.20 | | |
| $NaOH \cdot 2.5 H_2O$ (commercial 47%) | 0.24 | 0.15 | | |

At the end of the reaction of the acid laden organic solvent with the base, there is produced in one stage, a substantially acid free organic solvent layer and a liquid aqueous layer comprising phosphoric acid and a dihydrogen phosphate salt. The layers are separated and the organic layer recycled for reuse to prepare the acid laden organic phase. The aqueous layer has been found to contain only very small quantities of dissolved organic solvent in contrast to the aqueous layer produced by contact of the acid laden solvent layer with water which usually contains 1 – 10% of organic solvent. Thus with MIBK as solvent, release into water only gives an aqueous phase containing about 2% of solvent while release into aqueous sodium hydroxide solution to give an Na : P ratio of 0.3 : 1 (i.e. the aqueous solution contains 70% of the acid in the organic phase as unneutralized acid) resulted in an aqueous phase containing less than 0.02% of solvent. It may thus be possible to reduce solvent losses and to avoid having to strip residual solvent from the aqueous phase before it is sold or further processed.

The aqueous phase comprising phosphoric acid and the dihydrogen phosphate salt is a purified starting material suitable for conversion to a wide range of phosphate salts. When the amount of base is at or only slightly above the minimum, the aqueous phase has a crystallization point of 10° C or lower and therefore is suitable for movement inside plants or shipment without significant risk of crystallization of the material occurring.

The aqueous phase can be treated with further base to give the desired phosphate, e.g. the mono, di or tri cation phosphate (for use as such or, as for dipotassium hydrogen phosphate, for conversion to pyrophosphates) or mixture thereof, e.g. to give the mixture of 1 : 2 mono and di phosphate used as a precursor for spray drying and calcination to form sodium tripolyphosphate. Usually, the cationic part of the base for the further neutralization is the same as that of the base used in the process of the invention, but this need not be the case, as in the production of NPK fertilisers where a wide range of NPK proportions can be achieved by appropriate choice of the amounts of ammonia and potassium bases, each added at either stage in the neutralization.

The organic solvent solution of phosphoric acid is usually made by contact of wet process phosphoric acid and the solvent in one stage or at least two countercurrent stages, e.g. 2 – 6 stages, though at least two sequential stages of extraction may be used, the individual fractions being as such or combined together. The wet process acid is made by contact of sulphuric acid and calcium phosphate rock. The acidity of the acid, the proportion of solvent to acid in the extraction stage and the number of stages of extraction, and if necessary, the temperature are chosen so that usually 60 – 90% of the acid in the wet process acid is extracted, and usually the acid laden solvent solution contains 20 – 40% of $H_3PO_4$.

The appropriate acidity and solvent : acid weight ratio can be determined for each solvent by simple experiment. As a general principle within each of the groups of ketones, ethers, esters and alkanols, the higher the number of carbon atoms the higher the acidity of the crude acid needed for a constant solvent : acid weight ratio to produce the necessary degree of extraction of acid, and thence the necessary concentration of acid in the solvent. For a particular solvent and acid of a particular acidity, a decrease in the solvent : acid weight ratio results in an increase in the concentration of acid in the extract. Thus for a 1 : 1 solvent : acid weight ratio, methyl n propyl ketone requires an acid of acidity 50 – 65%, diethyl ketone requires an acid of acidity 60 – 75%, methyl isobutyl ketone an acidity of 70 – 85%, di-isopropyl ether an acidity of 65 – 85% and butyl acetate an acidity of 75 – 85% to give a suitable acid laden organic phase. The term acidity of the acid means the sum total of the phosphoric acid content and the sulphuric acid content. The proportion of sulphuric acid is preferably 0.5 – 10%, and especially 0.5 – 5% of the weight of phosphoric acid.

The contact of acid and solvent produces the extract and, usually an aqueous raffinate which contains most of the impurities present in the crude acid and is separated from the solvent extract. To avoid deposition of metal impurities during the subsequent neutralization of the phosphoric acid, the organic extract before contact with the base needs to contain less than 2,000 ppm total metal impurities preferably less than 500 ppm metal impurities, (based on the weight of phosphoric acid), e.g. less than 1,000 ppm Fe less than 500 ppm Al and less than 50 ppm Mg. If the initially formed extract contains too many impurities or if it is desired to reduce the impurity level further, than the extract is scrubbed by contact with a little water or aqueous purified phosphoric acid in one or more stages, the amount of acid in the liquor used for scrubbing being at least 10% of the acid in the organic extract. The used scrub liquor usually is fed back to the extraction stage. The purified phosphoric acid usually is made by contact of water and a little of the purified extract. The scrubbed organic extract is then ready for contact with the base. It is not essential that the organic extract contain less than the 2000 ppm total metal impurities mentioned but when it contains more, then precipitation of metal phosphates from these impurities will occur either during the partial neutralization before separation of solvent or during the subsequent neutralization. The precipitates will need to be separated and the separation of the precipitates involves loss of phosphate values and may make the complete separation of the solvent and aqueous layers more difficult.

The invention is illustrated in the following Examples; in this Specification percentages are by weight unless otherwise specified.

EXAMPLE 1

100 g. of a solution of phosphoric acid in methyl isobutyl ketone containing 27.8% $H_3PO_4$, 10.2% water, 62% methyl isobutyl ketone and less than 50 ppm total metal impurities was contacted at 32° C in one step with 6 g. of a 47% by weight aqueous solution of sodium hydroxide to give an organic phase of density 0.788 at 35° C (i.e. substantially acid free), and an aqueous phase of density 1.524 comprising phosphoric acid and sodium dihydrogen phosphate in an Na : P atom ratio of 0.25:1.

EXAMPLE 2

100 g. of a solution containing 28% $H_3PO_4$, 10% water, 62% methyl isobutyl ketone and less than 50 ppm total metal impurities was mixed at 24° C with 16.4 g. ammonium dihydrogen phosphate and 3.5 g. water to give a substantially acid free organic phase of density 0.813 and a liquid aqueous phase at 24° C comprising phosphoric acid and ammonium dihydrogen phosphate in an N : P atom ratio of 0.33 : 1.

EXAMPLE 3

100 g. of a solution containing 25.5% $H_3PO_4$, 7.0% water, 67.5% butyl acetate and less than 50 ppm total metal impurities was mixed at 60° C with 15.0 g. of ammonium dihydrogen phosphate and 4 g. of water to give a substantially acid free organic layer of specific gravity 0.86 at 50° C (wet butyl acetate at 50° C has S.G. 0.862), and a liquid aqueous phase comprising phosphoric acid and ammonium dihydrogen phosphate in an N : P atom ratio of 0.33 : 1.

EXAMPLE 4

100 g of the organic solution used in Example 3 was mixed at 60° C with 29.9 g of ammonium dihydrogen phosphate to give a substantially acid free organic layer and an aqueous phase at 60° C comprising phosphoric acid and ammonium dihydrogen phosphate in an N : P atom ratio of 0.5 : 1.

EXAMPLE 5

Using the procedure described in our German OLS 2320877, methyl isobutyl ketone was used to extract phosphoric acid from crude merchant grade wet process phosphoric acid prepared by contact of sulphuric acid on calcium phosphate rock, separation of the gypsum byproduct and concentration of the acid to merchant grade strength, 77.4%. The extraction produced an aqueous raffinate and an organic extract, which was scrubbed with phosphoric acid until the total metal impurity content of the extract was less than 40 ppm. 40.9 Imperial gals./hour (186 l/hr) of the organic extract of specific gravity 1.01 containing 26% $H_3PO_4$ and 64.5% methyl isobutyl ketone was contacted in a mixer-settler system with 196 lbs/hour (88.9 kg/hr) of an aqueous solution of phosphoric acid and sodium dihydrogen phosphate having an Na : P atom ratio of 0.6 : 1, the total concentration of phosphate (expressed as $P_2O_5$) being 39.9% to give 33.6 Imperial gals./hours (153 l/hr) of an organic methyl isobutyl ketone phase containing 0.7% $H_3PO_4$ of density 0.805 and 23.1 Imperial gals./hour (105 l/hr) of an aqueous phase of specific gravity 1.46 at about 60° C, comprising phosphoric acid and sodium dihydrogen phosphate in an atom ratio of Na : P of 0.3 : 1, the total concentration of phosphate (expressed as $P_2O_5$) being 46.1% and less than 0.02% methyl isobutyl ketone. The aqueous phase was divided into two equal portions, the first of which was the desired product for use or sale as such or after further neutralization. To the second portion of the aqueous phase of Na : P ratio of 0.3 : 1 as added 1.72 Imperial gals./hour (7.82 l/hr) of 50% aqueous sodium hydroxide solution of specific gravity 1.55 to give the aqueous solution comprising phosphoric acid and sodium dihydrogen phosphate of Na : P atom ratio of 0.6 : 1 and phosphate concentration (as $P_2O_5$) of 39.9% which is used for contacting further acid laden organic extract.

EXAMPLE 6

Diisopropyl ether (IPE) and aqueous wet process phosphoric acid were mixed to give a mixture containing in total 35% diisopropyl ether, 49.7% phosphoric acid and 15.3% water. The mixture was equilibrated at 30° C to give three phases, a top phase consisting substantially of IPE, a middle phase comprising IPE, phosphoric acid and water and an aqueous phase comprising aqueous phosphoric acid, 50 g of the middle phase containing less than 500 ppm total metal impurities were mixed with 3.45 g of 47% aqueous sodium hydroxide to give 26.5 g of organic solvent of specific gravity 0.779 and 26.7 g of an aqueous mixture of phosphoric acid and sodium dihydrogen phosphate with an Na : P ratio of 0.22 : 1 at 30° C.

EXAMPLES 7 – 12

Wet process phosphoric acid was extracted with methyl isobutyl ketone (MIBK) or butanol (BuOH) to give an organic extract containing less than 500 ppm total metal impurities, which was analysed for its phosphoric acid and water content. A known weight of the extract was treated with a dry base or aqueous solution of base to give an organic solvent layer, whose specific gravity and weight were measured, and an aqueous layer comprising phosphoric acid and a dihydrogen phosphate, the weight of which was measured. The amount of base needed to reduce the specific gravity of the solvent layer to a minimum was recorded. The results are shown in the following Table.

| Examples | Solvent | Acid conc. in organic % | H₂O conc. in organic % | Weight of extract g | Base | Weight of basic solution g | Cation : P ratio in aqueous | Weight aqueous g | Weight organic g | Specific Gravity of organic after releast |
|---|---|---|---|---|---|---|---|---|---|---|
| 7 | MIBK | 28 | 10 | 99.8 | dry Na₂CO₃ 0.880 | 6.5 (dry) | 0.42:1 | 38.5 | 63.3 | 0.816 |
| 8 | MIBK | 28 | 10 | 99.7 | NH₃ 47% | 6.6 | 0.29:1 | 41.7 | 63.7 | 0.826 |
| 9 | MIBK | 28 | 10 | 99.7 | NaOH 18% | 7.35 | 0.29:1 | 41.9 | 64.0 | 0.817 |
| 10 | MIBK | 28 | 10 | 100.5 | NaOH dry | 10.7 | 0.15:1 | 45.0 | 65.2 | 0.815 |
| 11 | MIBK | 28 | 10 | 99.2 | NaOH 47% | 4.56(dry) | 0.40:1 | 39.0 | 62.9 | 0.823 |
| 12 | BuOH | 28 | 28 | 103.9 | NaOH | 10.8 | 0.41:1 | 61.4 | 53.0 | 0.855 |

EXAMPLES 13 – 15

The aqueous layer produced in each of Examples 9 – 11 was treated with 47% sodium hydroxide solution to give an aqueous solution of mono sodium dihydrogen phosphate of Na:P 1 : 1, from which the phosphate salt was recovered by concentration and crystallization.

What we claim is:

1. A process which comprises contacting a one phase solution of phosphoric acid and water in an organic water immiscible solvent with a base, which is ammonia or a basic compound of ammonia, sodium or potassium, the base being anhydrous or with water in an amount of up to 10 moles, to give a liquid phase mixture comprising an organic solvent phase substantially free of phosphoric acid and an aqueous phase comprising phosphoric acid and the dihydrogen phosphate salt of the base, the aqueous phase containing an atom ratio (M:P) in the range 0.1:1 to 0.5:1, wherein M is ammonia, sodium or potassium, and then separating the organic phase from said aqueous phase, the amount of base being the value which under the reaction conditions is at least sufficient to release substantially all the acid from the organic solvent solution and at most, x times that value, where x is governed by the relationship $$x = \frac{b + 2c + d - 1}{b + 1.9c + d - 0.9}$$

in which $b$ is the number of moles of water associated with each mole of base added, $d$ is the number of moles of water produced by the neutralization of one mole of phosphoric acid by an equivalent of base and $c$ is the minimum number of moles of water per mole of phosphoric acid in an aqueous phosphoric acid solution in equilibrium with substantially acid free solvent at the aqueous reaction temperature.

2. A process according to claim 1 wherein the solution of acid and water in the solvent contains less than 2000 ppm total metal impurities based on the weight of H₃PO₄ in the solution.

3. A process according to claim 1 wherein the solvent is a dialkyl ketone of 5 or 6 carbon atoms, or dialkyl ether of 6 carbon atoms.

4. A process according to claim 3 wherein the solvent is methyl isobutyl ketone.

5. A process according to claim 1 wherein the amount of the compound which is basic or a dihydrogen phosphate salt is between the minimum needed to release substantially all the acid from the solvent phase and 1.4 times that minimum.

6. A process according to claim 1, wherein $$x \text{ is } \frac{9}{10}\left(\frac{b + 2c + d - 1}{b + c + d}\right),$$

the solution of acid and water in the solvent contains less than 2000 ppm total metal impurities and the solvent is selected from dialkyl ethers, alkenols and alkyl alkanoates each of 4 to 6 carbon atoms or dialkyl ketones of 5 or 6 carbon atoms.

7. A process according to claim 1 wherein the solution of acid and water in the solvent contains less than 2000 ppm total metal impurities and the amount of the compound which is basic or a dihydrogen phosphate salt is between the minimum needed to release substantially all the acid from the solvent phase and 1.4 times that minimum, and wherein said solvent is a dialkyl ketone of 5 or 6 carbon atoms, or a dialkyl ether of 6 carbon atoms.

8. A process according to claim 1 wherein said aqueous phase which comprises phosphoric acid and the dihydrogen phosphate salt is treated further with a base which is ammonia or a hydroxide, carbonate or bicarbonate of a cation which is ammonium, sodium or potassium, to give a salt which is monocation dihydrogen phosphate, dication hydrogen phosphate, trication phosphate or mixture thereof.

9. A process for preparing a phosphate salt which comprises contacting a one phase solution of phosphoric acid and water in an organic water immiscible solvent with a dihydrogen phosphate salt of ammonia, sodium or potassium, the salt being anhydrous or with water in an amount of up to 10 moles per mole of salt, to give a liquid phase mixture comprising an organic solvent phase substantially free of phosphoric acid and an aqueous phase comprising phosphoric acid and the dihydrogen phosphate salt, the aqueous phase containing an atom ratio (M:P) in the range 0.1:1 to 0.5:1, wherein M is ammonia, sodium or potassium, and then separating the organic phase from said aqueous phase, the amount of salt being at least the value which is just sufficient to release substantially all the acid from the organic solvent solution, and at most $y$ times that value where $y$ is governed by the relationship $$y = \frac{b + c - 1}{b + 0.9c - 0.9}$$

in which $b$ is the number of moles of water associated with each mole of dihydrogen phosphate added, and $c$ is the minimum number of moles of water per mole of phosphoric acid in an aqueous phosphoric acid solution in equilibrium with substantially acid free solvent at the aqueous reaction temperature.

10. A process according to claim 9 wherein the organic solution of acid and water is treated with an aqueous solution, which comprises phosphoric acid and a dihydrogen phosphate salt of a cation, which is ammonium, sodium or potassium, to give an organic solvent phase substantially free from phosphoric acid and an aqueous phase of phosphoric acid and the dihydrogen phosphate salt.

11. A process according to claim 10 wherein the aqueous solution, which contacts the acid laden organic solution, has a cation : P ratio of 0.5 : 1 to 0.8 : 1 in molar proportions.

12. A process according to claim 10 wherein said aqueous solution, which contacts the acid laden organic solution, has been prepared by addition of a base, which is a hydroxide, carbonate or bicarbonate of ammonium, sodium or potassium, to a portion of said aqueous phase, produced by the process.

13. A process according to claim 9 wherein the solution of acid and water in the solvent contains less than 2000 ppm total metal impurities and the solvent is selected from dialkyl ethers, alkanols and alkyl alkanoates each of 4 to 6 carbon atoms or dialkyl ketones of 5 to 6 carbon atoms.

14. A process according to claim 12 wherein the solvent is methyl isobutyl ketone, the solution of acid and water in the solvent contains less than 2000 ppm total metal impurities and the amount of base used to generate the aqueous solution for contacting the acid laden solvent is between the minimum needed to release substantially all the acid and 1.4 times that minimum.

15. A process according to claim 4 wherein the solution of acid and water in the solvent contains less than 2000 ppm total metal impurities (based on the weight of $H_3PO_4$ in the solution).

16. A process according to claim 14 wherein the aqueous solution which contacts the acid laden organic solution has a cation: P ratio of 0.5:1 to 0.8:1 in molar ratio.

17. A process according to claim 9 wherein $y$ is $$\frac{9}{10}\left(\frac{b + c - 1}{b}\right)$$

the solution of acid and water in the solvent contains less than 2000 ppm total meal impurities and the solvent is selected from dialkyl ethers, alkanols and alkyl alkanoates each of 4 to 6 carbon atoms or dialkyl ketones of 5 or 6 carbon atoms.

18. The process of claim 9 wherein said one phase solution in said organic water immiscible solvent is contacted by said dihydrogen phosphate salt together with water in an amount between 0.5 and 3 moles of water per mole of said salt.

19. The process of claim 14 wherein said one phase solution of phosphoric acid and water in an organic water immiscible solvent is prepared by contacting wet process phosphoric acid with said solvent to produce said one phase solution and an aqueous raffinate which are then separated.

20. A process according to claim 9 wherein said aqueous phase which comprised phosphoric acid and the dihydrogen phosphate salt is treated further with a base which is ammonia or a hydroxide, carbonate or bicarbonate of a cation which is ammonium, sodium or potassium, to give a salt which is monocation dihydrogen phosphate, dication hydrogen phosphate, trication phosphate or mixture thereof.

* * * * *

UNITED STATES PATENT AND TRADEMARK OFFICE
CERTIFICATE OF CORRECTION

PATENT NO. : 4,112,118
DATED : September 5, 1978
INVENTOR(S) : Frank Michael CUSSONS et al It is certified that error appears in the above—identified patent and that said Letters Patent is hereby corrected as shown below:

Column 12, between lines 10 and 28, in the table, right column, in the fifth line of the heading, replace "releast" with --release--.

Column 12, line 34; column 12, line 40; column 13, line 34; and column 14, line 8: in each instance, after "impurities" insert --based on the weight of $H_3PO_4$ in the solution--.

Signed and Sealed this

Eighteenth Day of January 1983

[SEAL]

Attest:

GERALD J. MOSSINGHOFF

Attesting Officer        Commissioner of Patents and Trademarks